Jan. 26, 1943.  E. D. EKKEBUS  2,309,446
PISTON MEMBER AND METHOD OF MANUFACTURING IT
Filed April 19, 1940  2 Sheets-Sheet 1
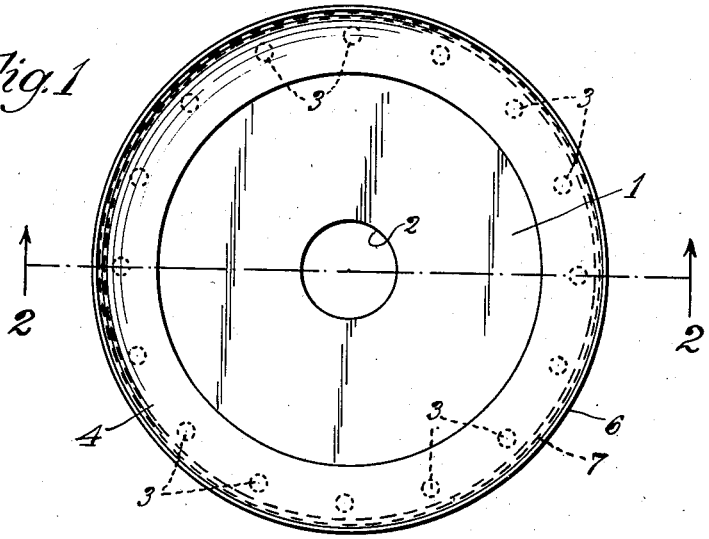
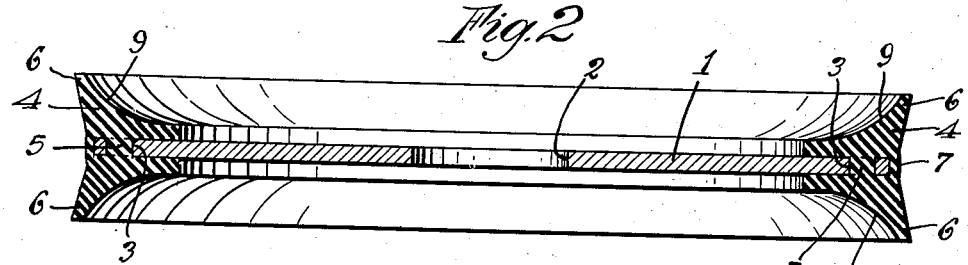
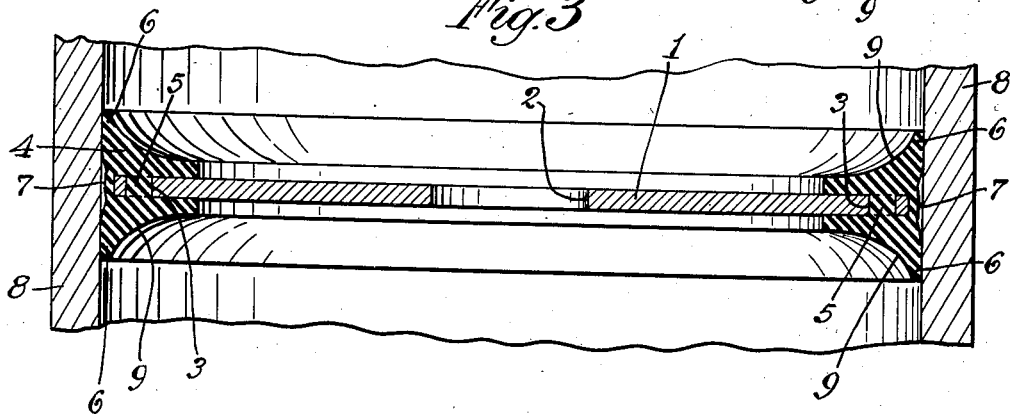
Inventor
Eloy D. Ekkebus
by Parker & Carter
Attorneys.

Jan. 26, 1943. E. D. EKKEBUS 2,309,446
PISTON MEMBER AND METHOD OF MANUFACTURING IT
Filed April 19, 1940 2 Sheets-Sheet 2

Inventor.
Eloy D. Ekkebus.
by Parker & Carter
Attorneys.

Patented Jan. 26, 1943

2,309,446

UNITED STATES PATENT OFFICE 2,309,446

PISTON MEMBER AND METHOD OF MANUFACTURING IT

Eloy D. Ekkebus, Mount Prospect, Ill., assignor to Chicago Belting Company, Chicago, Ill., a corporation of Delaware Application April 19, 1940, Serial No. 330,466

4 Claims. (Cl. 309—33)

My invention relates to an improvement in packings and has for a particular purpose the provision of an improved piston plate and packing therefor, adapted for use, for example, where an equally effective seal is desired at each direction of movement of a piston.

Another purpose is the provision of a simple, light and economical piston disc structure.

Another purpose is the provision of an improved means for manufacturing a complete piston disc, with an associated peripheral packing therefor.

Another object is to provide a piston packing or stuffing box construction.

Other purposes will appear from time to time in the course of the specification and claims.

I illustrate my invention more or less diagrammatically in the accompanying drawings, wherein:

Figure 1 is a plan view of my combined disc and packing;

Figure 2 is a section on the line 2—2 of Figure 1, on an enlarged scale;

Figure 3 is a view similar to Figure 2, illustrating the disc and packing in position within a cylinder;

Like parts are indicated by like symbols throughout the specification and drawings.

Figure 4:
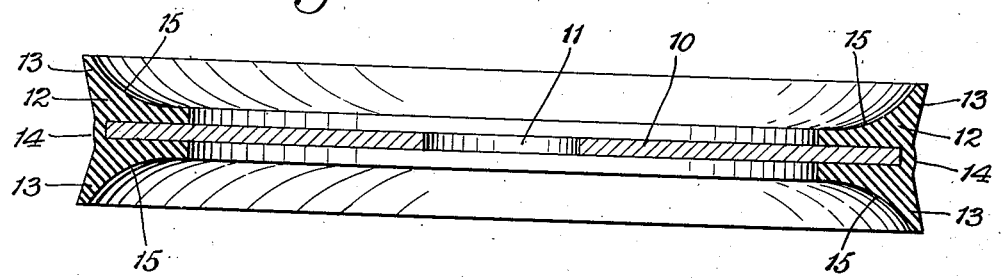
Figure 4 is a view generally similar to Figure 2, showing the packing secured to a disc without perforations.

Referring to the drawings, 1 indicates a disc which may be of metal or any suitable material and which may be provided with a central aperture 2, whereby it may be secured in any suitable manner to a piston actuating rod or the like. The disc may be provided, adjacent its periphery, with a plurality of holes 3 extending therethrough and serving as means for bonding or securing the packing 4 in relation to the edge of the disc 1. The disc may also be treated to create small crevices or roughnesses on that portion which the packing will contact so that the packing will successfully bond with the disc. Where perforations 3 are used, such roughening may or may not be used or the roughening may be used without the perforations.

As will be seen in Figures 2 and 3, the packing, which may be of rubber or any suitable rubber-like material—for example, neoprene—is integrally formed about the edge of the disc 1 and includes portions 5 extending through the apertures 3, if they are present, or into the crevices if the latter are present. Preferably the difference between the outer and inner radii of the packing is less than the radius of the disc. Referring to Figure 2, the packing 4 has opposite outwardly extending flanges or lips 6, which, when not compressed, are of a diameter somewhat exceeding the diameter of the intermediate portion 7 of the packing 4. This outward flare is advantageous since, when the disc and its packing are positioned within a cylinder 8 or equivalent structure, the lips 6 adhere closely to the inner face of the cylinder 8 in an effective sealing contact, while the central portion 7 clears the inner face of the cylinder.

I find it advantageous, also, to form the packing 4 with arcuate inner defining surfaces, as shown, for example, at 9. In practice, a firm seal is thereby maintained with a minimum of wear or distortion.

In the manufacture of the articles I may employ rubber or any other suitable rubber substitutes or other substances having the general characteristics of rubber, such as flexibility, deformability and the like. I find neoprene one of many practical substances, including Buna, Vinylite, et cetera.

In the manufacture of the device I may employ any suitable mold. Preferably, the outer edge of the disc is first coated with a suitable adhesive. I may, for example, employ a rubber hydrochloride adhesive. Thereafter, the disc 1 is placed in the mold, with one or more pieces—for example, of neoprene or any other suitable substance—and the material is subjected to heat and pressure until it is formed into the form shown, for example, in Figure 2, with part of the material passing through the apertures 3, as shown at 5 in Figure 2. Vulvanization and/or polymerization may occur during this application of heat and pressure. The rubber or rubber substitute is also firmly bonded to the disc by the above mentioned adhesive, and there is no possiblty of the packing material becoming freed or separated from the disc 1 under any ordinary operating circumstances.

In the modified form of Figure 4, the device differs only from the form of Figure 2 by the omission of the perforations 3 and by the addition of some roughening on the disc 10. Instead of perforations, the edges of the disc 10 are roughened to produce a surface with which the rubber or rubber substitute will bond. This may be such a roughening as would be produced by sand blasting. Small crevices may be formed by any treatment, and, in fact, any form of roughening which will produce a satisfactory bond is within the contemplation of the invention. A roughened edge may be used in combination with perforations such as the perforations 3 of Figure 2. The disc 10 is provided with a perforation 11 similar to the perforation 2. The packing of Figure 4 is substantially the same as that of Figure 2 except that the portions 5 are omitted since no perforations 3 are present. Thus, in the form of Figure 4, the packing is designated generally as 12; it has two outwardly extending flanges or lips 13 and an intermediate portion 14. The inner surfaces of the packing are preferably arcuate or curved as at 15.

Figure 5:
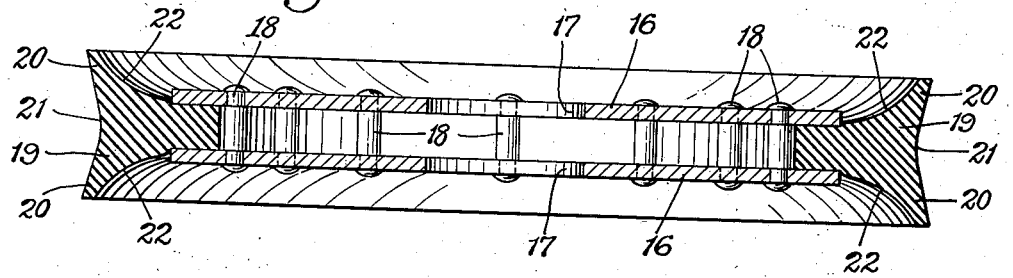
Figure 5 is a view generally similar to Figures 2 and 4, showing the packing gripped between two discs.

In the modified form of Figure 5, there are two discs 16 which are perforated as at 17 and joined by rivets 18. The packing 19 is gripped between the edges of the discs 16; similarly, too, the packings shown in Figures 2 and 4. The packing 19 is provided with outwardly flaring flanges or lips 20 and an intermediate portion 21. The inner faces of the packing are preferably curved or arcuate as at 22.

Figure 6:
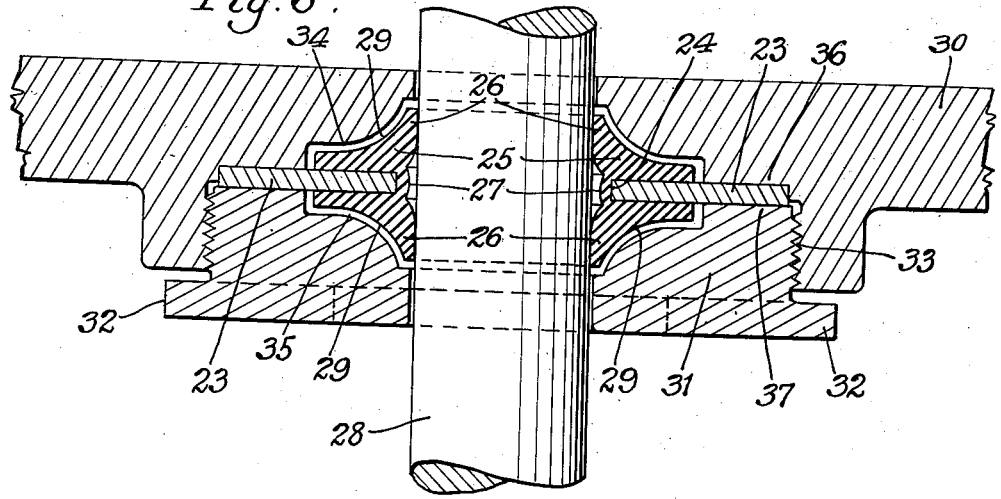
Figure 6 is a longitudinal section, showing the packing of the peripheral invention mounted to serve as a piston rod packing.

In the modified form of Figure 6, the packing of the invention is arranged not on the periphery of a disc or other member but is arranged about and within a perforation and serves primarily as a piston rod packing. In this form of the invention a supporting disc 23 is perforated as at 24 and the packing 25 also is mounted on the disc and lies partially within the perforation 24. The packing comprises two flanges or lips 26 with an intermediate space or portion 27. As shown, the packing engages a rod or shaft 28, and the form of contact between the members 26 and the member 28 is substantially the same as the contact shown in Figure 3 between the portions 6 of the packing and the walls of the cylinder 8. The outer surfaces of the packing are preferably curved or arcuate as at 29. The piston packing is thus substantially the same as the packing shown in the earlier figures. The lips engage the rod member which they contact with a sealing and packing effect and the space between the lips—either 7 or 14 or 21 or 27—is out of contact with the member which is being sealed.

The piston packing is mounted in place, for example, in the member 30 in a suitable depression or socket and is held in place by the gland 31 which is provided with a member 32, preferably having an angular shape so that it may be engaged by a tool. The gland 31 is threaded and engages threading 33 formed in the member 30. The member 30 is preferably cut away as at 34 to provide a clearance between it and the packing 25. Similarly, the gland 31 is cut away as at 35 to provide a clearance between it and the packing. As shown, there is no contact between the packing and the perforations 34 and 35. For some purposes, there might be some contact but, in general, there should be sufficient clearance between the packing and the surrounding housing members to permit the packing to flex satisfactorily for satisfactory sealing.

It will be realized that, whereas I have described and shown a practical and operative embodiment of my invention and the method for carrying it out, nevertheless many changes may be made in the size, shape, number and disposition of parts and in the details and steps of such method without departing from the spirit of my invention. I, therefore, wish my description and drawings to be taken as in a broad sense illustrative or diagrammatic rather than as limiting me to my precise showing.

In particular, the invention is not limited to any special way of making the packing. It might be made as above described or the disc might be coated with a suitable adhesive or cement and an extruded form of unvulcanized and/or unpolymerized rubber or rubber substitute in the general shape of the packing might be positioned about the edge of the disc and then molded in a suitable mold under heat and pressure until the complete packing has been vulcanized and/or polymerized. The invention is, therefore, not limited to any particular method either of forming the packing or of applying it to the disc.

The use and operation of this invention are as follows:

I find that, where it is important to move a piston or piston plate alternately in opposite directions in a cylinder where a tight sealing action is desired at each direction of movement of the piston, a highly efficient lip action and a constant seal is provided by forming the inner face of each lip with an arcuate contour. This arcuate contour, shown in Figures 2 and 3, when taken in connection with the outward flare of the packing, as at 6 in Figure 2, provides for tolerances in the manufacture of the disc, of the packing and of the cylinder. The packing is thus oversize at the outer edges and undersize at the middle portion 7.

The use and operation of the forms of Figures 4 and 5 is essentially the same as that described in connection with Figures 2 and 3.

The use and operation of the form of Figure 6 is essentially the same as that described in connection with the other figures. The packing operates substantially the same whether it be on the periphery of a member or positioned within a perforation in the member. Thus, the members provide a tight sealing effect on the member 28 whether it is stationary or in movement in either direction. The shape of the lip portions 26 accomplishes satisfactory sealing where motion occurs in either direction. The same general arrangement of slightly oversized lips and an undersized or inwardly spaced intermediate portion 27 is found in Figure 6 and is also found generally in the earlier described forms of the device so that there are two portions of the packing which are in contact with the member to be sealed and an intermediate portion which is out of contact with that member.

I claim:

1. As a new article of manufacture, a packing member and support therefor, which includes a circular flat relatively stiff single disc of sheet stock, said disc having a plurality of apertures adjacent and spaced circumferentially about its edge, and a single packing ring of flexible rubber-like material extending about the disc edge and permanently secured thereto and including integral portions extending into the apertures in said disc, the difference between outer and inner radii of said ring being substantially less than the radius of the disc, whereby the radial overlap of ring and disc is substantially less than the radial extension of the disc as a whole, said ring being bounded at its opposite sides by generally arcuate faces and increasing in longitudinal thickness progressively outwardly toward the edge of the disc, the outer face of the ring being concave, with its maximum diameter at the opposite lip edges.

2. As a new article of manufacture, a packing member and support therefor, which includes a circular flat relatively stiff single disc of sheet stock, said disc having a plurality of apertures adjacent and spaced circumferentially about its edge, and a single packing ring of flexible rubberlike material extending about the disc edge and permanently secured thereto and including integral portions extending into the apertures in said disc, the difference between outer and inner radii of said ring being substantially less than the radius of the disc, whereby the radial overlap of ring and disc is substantially less than the radial extension of the disc as a whole, said ring being bounded at its opposite sides by generally arcuate faces and increasing in longitudinal thickness progressively outwardly toward the edge of the disc, the outer face of the ring being concave, with its maximum diameter at the opposite lip edges, said disc having a central aperture remote from said ring, the portion of the disc between said aperture and the nearest edge of the ring being left bare.

3. As a new article of manufacture, a packing member and support therefor, which includes a circular flat relatively stiff single disc of sheet stock, and a single packing ring of flexible rubberlike material extending about the disc edge and permanently secured thereto, the difference between outer and inner radii of said ring being substantially less than the radius of the disc, whereby the radial overlap of ring and disc is substantially less than the radial extension of the disc as a whole, said ring being bounded at its opposite sides by generally arcuate faces and increasing in longitudinal thickness progressively outwardly toward the edge of the disc, the outer face of the ring being concave, with its maximum diameter at the opposite lip edges.

4. As a new article of manufacture, a packing member and support therefor, which includes a circular flat relatively stiff single disc of sheet stock, and a single packing ring of flexible rubberlike material extending about the disc edge and permanently secured thereto, the opposed faces of said disc and said packing ring including interpenetrating portions, the difference between outer an dinner radii of said ring being substantially less than the radius of the disc, whereby the radial overlap of ring and disc is substantially less than the radial extension of the disc as a whole, said ring being bounded at its opposite sides by generally arcuate faces and increasing in longitudinal thickness progressively outwardly toward the edge of the disc, the outer face of the ring being concave, with its maximum diameter at the opposite lip edges.

ELOY D. EKKEBUS.

DISCLAIMER 2,309,446.—*Eloy D. Ekkebus*, Mount Prospect, Ill. PISTON MEMBER AND METHOD OF MANUFACTURING IT. Patent dated January 26, 1943. Disclaimer filed January 27, 1945, by the assignee, *Chicago Belting Company*.

Hereby enters this disclaimer to claims 3 and 4 in said specification.

[*Official Gazette February 20, 1945.*]